A. M. STANLEY.
AUTO SIGNAL.
APPLICATION FILED OCT. 27, 1919.
1,406,694.
Patented Feb. 14, 1922.
2 SHEETS—SHEET 1.
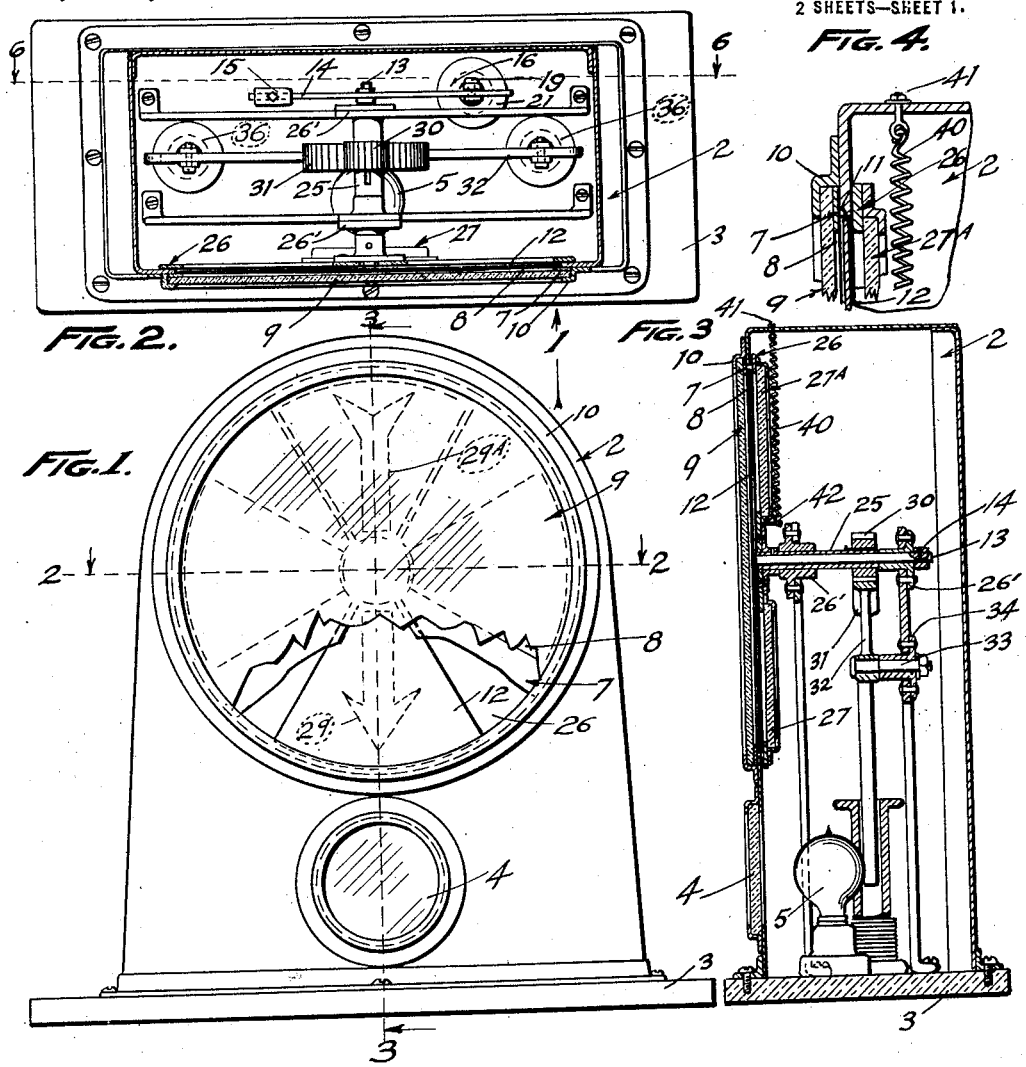
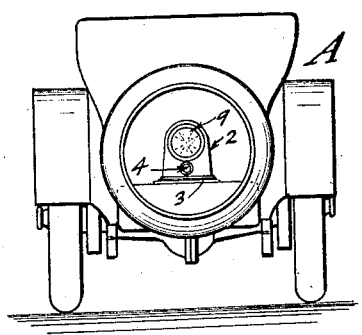
INVENTOR.
ALBERT M. STANLEY.
BY Hazard & Miller
ATTORNEYS.

A. M. STANLEY.
AUTO SIGNAL.
APPLICATION FILED OCT. 27, 1919.
1,406,694.
Patented Feb. 14, 1922.
2 SHEETS—SHEET 2.
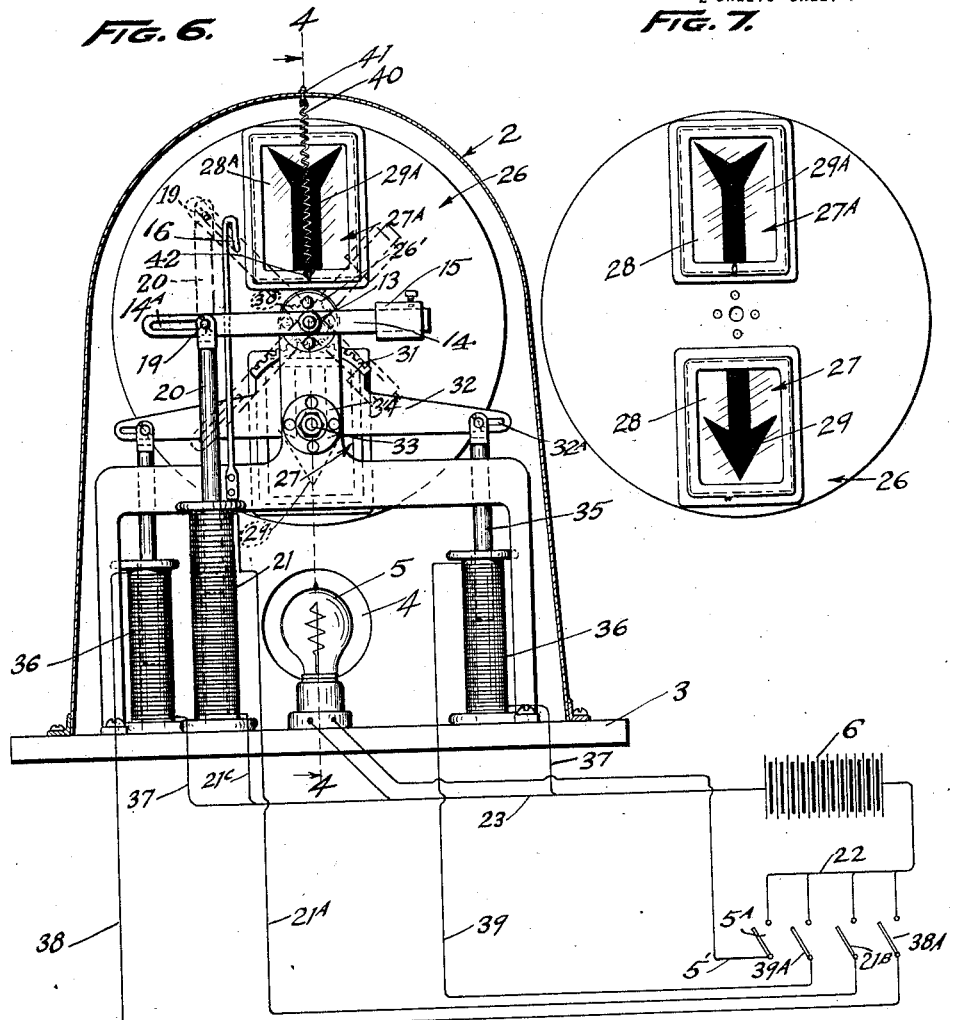
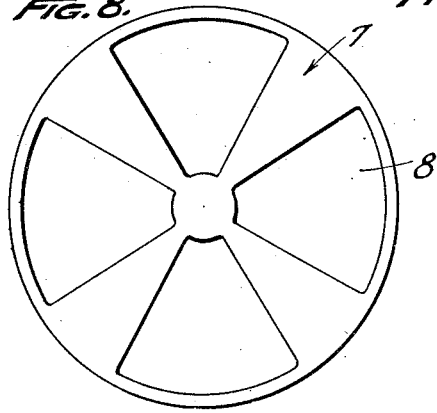
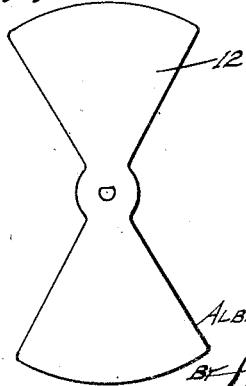
INVENTOR.
ALBERT M. STANLEY.
BY Hazard & Miller,
ATTORNEYS.

UNITED STATES PATENT OFFICE.

ALBERT M. STANLEY, OF PALMS, CALIFORNIA.

AUTO SIGNAL.

1,406,694.  Specification of Letters Patent.  Patented Feb. 14, 1922.

Application filed October 27, 1919. Serial No. 333,636.

*To all whom it may concern:*

Be it known that I, ALBERT M. STANLEY, a citizen of the United States, residing at Palms, in the county of Los Angeles and State of California, have invented new and useful Improvements in Auto Signals, of which the following is a specification.

This invention relates to signal devices and more particularly to a type of signal apparatus readily applicable to the rear end structure of automobiles or other vehicles; and it is an object of the invention to provide a signal apparatus whereby the intended control of the vehicle can be efficiently disclosed to those in the rear of the vehicle; and it is an object of the invention to provide a device of this character that is simple, practical, and easily controlled or operated and which will comply with the requirements of the laws now obtaining in some jurisdictions requiring the display of signals especially at nights as to the intended control of a vehicle; and it is also an object of the invention to provide a device that is equally as serviceable in daytime so that it can be applied and used on closed type of vehicles from which it is not convenient, ordinarily for the driver to give the usual arm signals, now commonly practiced throughout territories where vehicular traffic is congested or general.

The invention consists of the construction and details, forms of which are illustrated in the accompanying drawings and described and claimed hereinafter.

Figure 1 is a rear elevation or face view of the device partly broken away.

Fig. 2 is a section on line 2—2 of Fig. 1.

Fig. 3 is a vertical central section on line 3—3 of Fig. 1.

Fig. 4 is an enlarged sectional detail of the upper front corner of the casing showing more clearly the assembly of the parts at the front of the device.

Fig. 5 is a rear end elevation of an automobile showing the device applied.

Fig. 6 is a section substantially on line 6—6 of Fig. 2 and showing diagrammatically the wiring connections.

Fig. 7 is a plan or face view of the indicator or pointer disc.

Fig. 8 is a plan or face view of the window dial.

Fig. 9 is a plan or front view of a shutter to cover the windows.

My invention is embodied, in the illustrated form, in a suitable casing 2 which may have a base 3 by which it may be readily attached to any suitable and convenient portion at the rear of a vehicle, such as an automobile A, Fig. 5. The front of the casing is provided at its lower portion with a tail-light lens or window 4 preferably colored red, and behind this and within the casing is arranged an electric bulb 5 or other source of light which may have electric circuit wires 5' connected to a battery or other source of current 6, the wires including a switch $5^a$ for controlling the passage of current to the tail-light 5.

Preferably the interior of the casing 2 is finished with a reflecting surface so that the rays of light may be directed forwardly from the back and show through a series of window openings that are provided in a suitable device as, for instance, a dial member 7 of circular form in which the windows 8 of segmental outline are shown clearly in Fig. 8. This dial may be suitably formed on or laid against a front outer window 9 retained in a suitable form of bezel 10 beneath which the window 9 and the dial 7 are secured; the casing being plainly shown in Fig. 4 as provided with an opening 11 approximately equal to the opening within the bezel 10.

The dial 7 is preferably arranged with the windows respectively on horizontal and vertical axes, and occupying a position immediately against the front wall of the casing and opening 11 therein there is provided a suitable form of shutter 12 having diametrically opposite segments each approximating the area of the individual windows 8 in the dial 7, and this shutter 12 is shown as fastened at its center on a central shaft 13 the opposite end of which is provided with a lever arm 14, Fig. 6, extending across its end and provided with a counterweight 15 to counterbalance the actuating mechanism by which the shutter 12 can be swung from a normally vertical position to a horizontal or transverse position across the dial 7 for the purpose of uncovering the upper and lower windows 8 thereof. The shutter 12 is normally held in its vertical position by any suitable means, such as the counterweight 15 which swings the arm 14 against a stop 16.

In the present case, the shaft 13 is turned by means of the lever 14 which is shown as slotted as at 14ª to receive a pin 19 or other suitable connection on the upper end of a solenoid rod 20 which plays in a solenoid coil 21 appropriately mounted within the casing 2 and having a terminal wire 21ª leading to its switch 21ᵇ which has a pole or contact connected to a common wire 22 which is connected to the battery 6 and from the opposite pole of which battery runs a common wire 23 with a branch 21ᶜ for the solenoid 21. Obviously by the closure of the switch 21ᵇ the solenoid 21 will be energized and this will attract the core 20 which will rock the lever 14 and thus swing the shutter 12 to a horizontal position to uncover the vertical windows so that the light from the bulb 5 can shine through.

The shaft 13 extends centrally through a sleeve or hollow shaft 25 which is supported in suitable bearings 26', and the end of the shaft 25 that is adjacent to the opening 11 of the casing carries an indicator or pointing member of suitable form of construction, and in the present case this is shown as embodying a disc 26 of approximately equal area to the area of the window or opening 11 or a little larger, and the disc 26 is shown as made of opaque material and has diametrically opposite windows 27 and 27ª in which may be mounted signal forming panels 28 and 28ª, and these panels may be either opaque with transparent portions forming the signal or they may be transparent and have opaque portions forming the signal. For instance, the window panels 28 and 28ª can be made of frosted glass and have portions 29 and 29ª translucent and colored, for instance red, these portions 29—29ª here shown as in the outline of the alined sections of an arrow or spear, which, by this construction is therefore shown as of a length substantially equal to the diameter of the disc 26.

In either of the modes of construction when the disc 26 is rotated from its normal position with the arrow 29—29ª in a vertical position its point can be turned toward the right or toward the left to show through respective horizontal windows 8 in Fig. 8 and thus indicate to an observer at the rear of the vehicle the intention of turning the vehicle in the respective direction. This swinging of the pointer or arrow 29—29ª either to the right or to the left may be accomplished by suitable means and here shown as comprising a pinion 30 suitably fastened on the shaft or sleeve 25 and meshing with a segmental gear 31 formed on the upper edge of a walking beam or lever 32 that is pivoted on a stud shaft 33 mounted in a suitable bracket or bearing 34.

The diametrically opposite ends of the lever 32 are shown as slotted at 32ª to make a relatively movable connection with the upper ends of the solenoid cores 35 appropriately positioned within the casing 2, these operating in solenoid coils 36 having respective branch wires 37 connected to the common wire 23 leading to the battery. The opposite terminals of the solenoid coils 36 are extended as at 38 and 39 to respective switches 38ª and 39ª upon the closure of which the respective solenoid 36 will be energized to effect the throwing the lever 32 and the rotation thereby of the pinion 30 with its shaft 25 to swing the disc 26 in the direction desired to set the indicator or pointer 29—29ª to read left or right.

For the purpose of holding the pointer 29—29ª in a vertical position with its point end directed downwardly to indicate stop when the vehicle windows 8 are uncovered by the shutter, a spring 40 can have one end attached to a fixed part as 41 in the casing and its other end attached as at 42 to a support adjacent the hub of the disc 26, this spring tending by its contraction to hold the disc in the position indicated in Fig. 7, and yet when either of the solenoids 36 is energized the spring will yield to permit the free rotation of the indicating disc 26 and will automatically restore the disc to the position in Fig. 7 when the actuating solenoid is de-energized.

The operation, therefore, of the device above described is substantially as follows: Having attached the signal casing 2 to the desired support on the rear of the vehicle and installed the control switches 21ᵇ, 39ª and 38ª in a position convenient to the operator of the vehicle and properly wired up the circuit with respect to the source of electricity 6, the parts of the mechanism will normally stand with the shutter 12 in a vertical position to cover the vertically opposite windows 8 in the dial and thus cover the pointer 29—29ª, Fig. 7 and prevent the light from the bulb 5 showing through the transparent portion of the indicator on the disc 26.

If the driver desires to indicate that he is about to stop the vehicle he will then press or close the switch contact 21ᵇ whereupon the solenoid 21 will be energized and the lever 14 rocked, as indicated by the dotted lines in Fig. 6, to turn the shutter 12 to a horizontal position which will therefore uncover the vertical window openings 8, so that the light can shine through the transparency or opaque signal form part 29—29ª this remaining in its normal vertical position when the shutter 12 is turned.

If the operator intends to turn the car to the right or to the left he will then press the respective switch 39ª or 38ª to energize one or the other of the solenoids 36 to rock the lever 32 and thus rotate the indicating disc 26 so as to bring its arrow to point either to the left or to the right as the case may be. As soon as the current is broken or interrupted at the solenoid 36 that has been energized the indicator disc 26 will be automatically restored to its normal position shown in Fig. 7 by the spring 40.

From the above it will be seen that the tail-light 5 can be energized independently of the signal indicating apparatus and yet its rays can be utilized in combination with the indicator to give the desired signals right, stop or left.

Various changes may be made without departing from the spirit of my invention as claimed.

I claim:

1. A direction indicator for vehicles comprising a casing provided in one of its walls with quaternate diametrically opposed windows, a shutter pivotally mounted within said casing immediately to the rear of said windows and having diametrically opposed vanes of sufficient size to mask said windows, a direction indicator pivotally mounted immediately to the rear of said shutter and having translucent portions that are adapted to coincide with the windows in the casing, and electro-magnetic means to actuate said shutter and said indicator independently of each other.

2. A direction indicator for vehicles comprising a casing provided in one of its walls with quaternate diametrically opposed windows, a shutter pivotally mounted within the casing immediately to the rear of said windows and having two diametrically opposed vanes of sufficient size to mask said windows, a direction indicator pivotally mounted back of said shutter having signal portions adapted to register with the windows in the casing, and electro-magnetic means to selectively actuate said shutter and said indicator independently of each other.

3. A direction indicator for vehicles comprising a casing provided in one of its walls with quaternate diametrically opposed windows, a shutter pivotally mounted within said casing immediately to the rear of said windows and having two diametrically opposed vanes that are adapted to register with and mask said windows, electro-magnetic means for actuating said shutter, an opaque disc pivotally mounted immediately to the rear of said shutter and having signal means thereon adapted to register with said windows, independent electro-magnetic means for actuating said disc, a window in the front wall of the casing below the first mentioned window, and a lamp within the housing to the rear of the lower window, the rays of light from which lamp pass directly through the adjacent window and upwardly to illuminate the interior of the housing, means for selectively actuating said electro-magnetic means.

4. A direction indicator for vehicles comprising a casing having quaternate diametrically opposed windows, means to illuminate the interior of the casing, a shutter pivotally mounted within said casing adjacent said windows having two diametrically opposed vanes adapted to register with opposed windows, means for actuating said shutter from a vertical to horizontal position, an opaque disc pivotally mounted back of said shutter and having windows therein and signal means on said windows adapted to register with the casing windows, and independent means for actuating said disc through an arc of ninety degrees.

5. A direction indicator for vehicles comprising a casing having four diametrically opposed windows disposed in substantially vertical and horizontal opposition, a shutter pivotally mounted within said casing adjacent said windows having two diametrically opposed vanes adapted to register with two similarly opposed windows in the casing, said shutter being mounted to stand in a normally vertical position, means for independently actuating said shutter from a vertical to horizontal position, an opaque disc pivotally mounted back of said shutter and having two diametrically opposed windows therein in normally vertical alinement signal means on said windows adapted to register with similarly opposed windows in the casing, means for independently actuating said disc through an arc of ninety degrees and means to selectively actuate said shutter and disc actuating means.

In testimony whereof I have signed my name to this specification.

ALBERT M. STANLEY.